June 2, 1964   M. F. UMSTEAD   3,135,391
RACK FOR CONTAINERS
Filed May 25, 1962   2 Sheets-Sheet 2
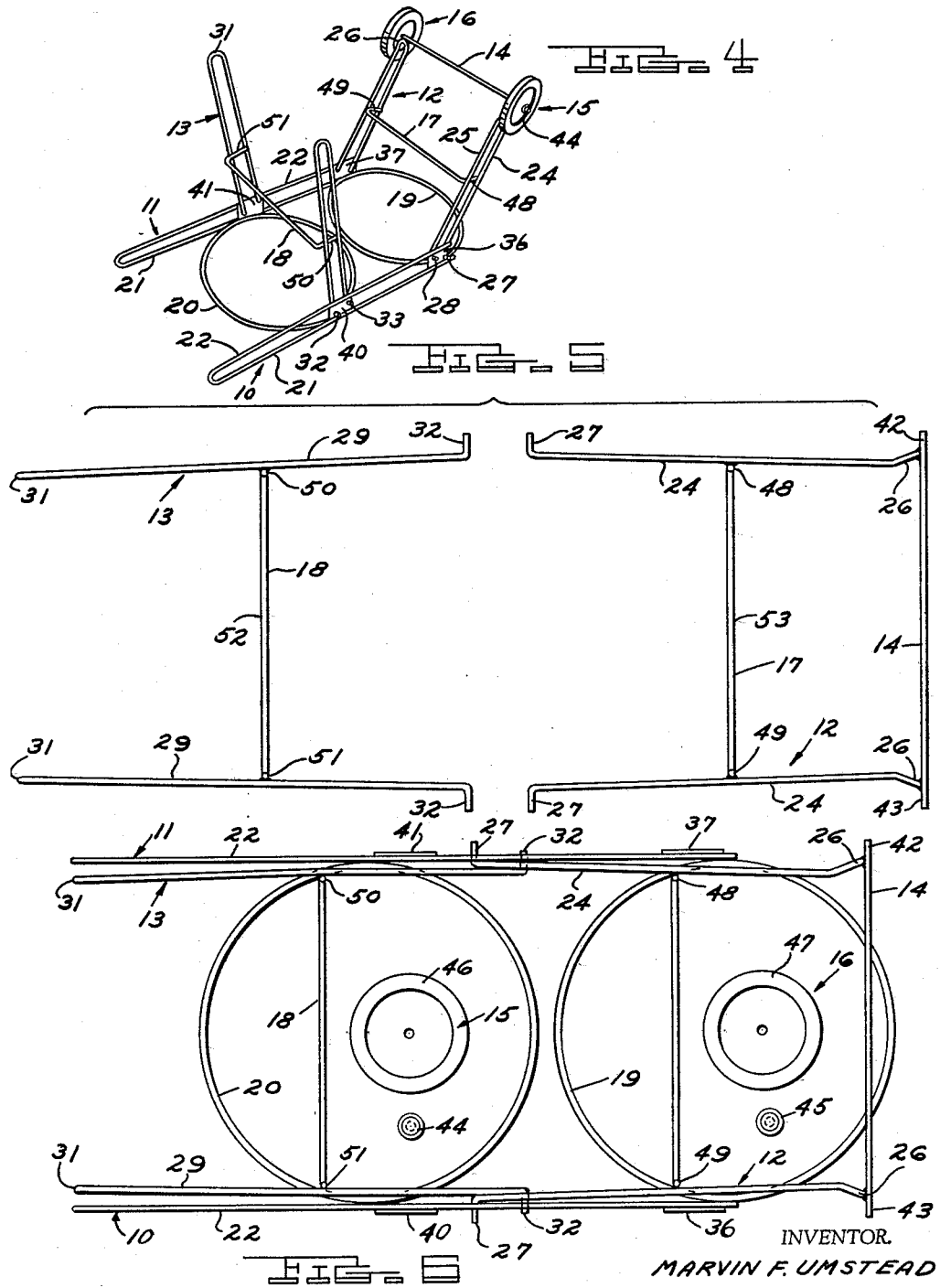
INVENTOR.
MARVIN F. UMSTEAD
BY
Whittemore, Hulbert & Belknap
ATTORNEYS

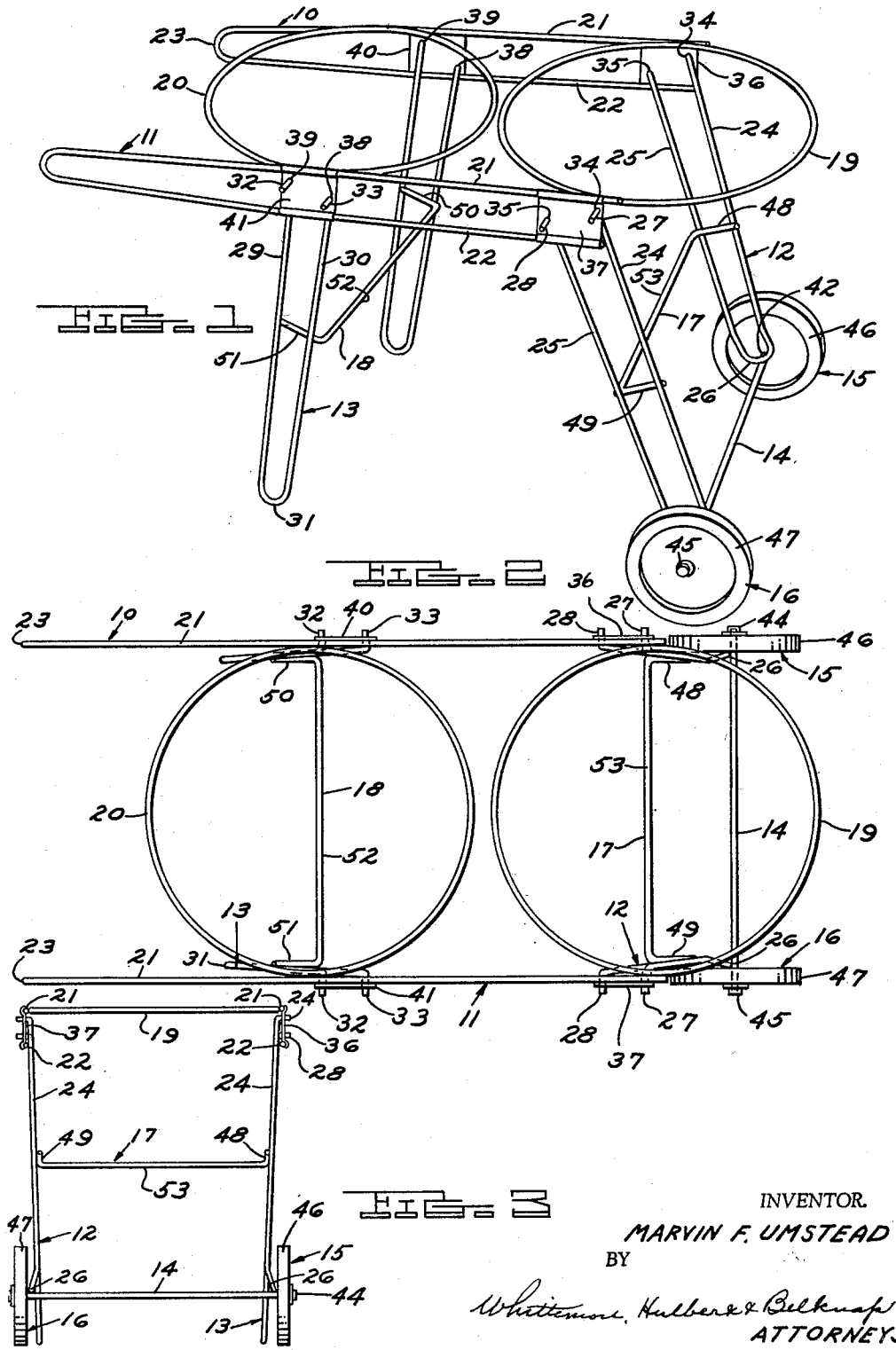

United States Patent Office 3,135,391
Patented June 2, 1964

3,135,391
RACK FOR CONTAINERS
Marvin F. Umstead, 18204 Parkside Ave.,
Detroit 21, Mich.
Filed May 25, 1962, Ser. No. 197,631
2 Claims. (Cl. 211—85)

This invention relates generally to carts for containers, and refers more particularly to a cart capable of holding two containers such as garbage cans, cylindrical receptacles, bushel baskets and the like.

One of the essential objects of the invention is to provide a lightweight cart composed of parts that can be easily assembled or disassembled.

Another object is to provide a cart having substantially parallel dual horizontal sides provided at the rear ends thereof with portions constituting handles, and having longitudinally spaced substantially parallel downwardly diverging dual supporting legs between and secured to said sides.

Another object is to provide a cart wherein the front and rear supporting legs are reinforced and braced substantially midway their ends by front and rear substantially U-shaped crossbars that open in opposite directions in substantially a common horizontal plane, and that serve as bases or supports for the containers, or as supports for one or more planks or boards.

Another object is to provide a cart wherein two longitudinally spaced rings are located between and are secured to the uppermost arms of the dual horizontal sides for retaining containers and the like upon the crossbars.

Another object is to provide a cart wherein the front and rear crossbars serve as braces to maintain the front and rear legs in proper laterally spaced relation to each other, and cause the laterally extending outward projections of the supporting legs to be maintained under tension in the openings therefor in the vertical metal plates secured to the horizontal metal sides, so that fasteners such as bolts, nuts, screws and the like are unnecessary.

Another object is to provide a cart wherein an axle for two ground engaging wheels is secured to the open return bent portions at the lower ends of the front supporting legs.

Another object is to provide a cart wherein slight outward bends in the open return bent portions at the lower ends of the front supporting legs serve to space the tires of the ground engaging wheels outwardly from and out of contact with the front supporting legs.

Another object is to provide a cart wherein the ground engaging wheels are held in proper relation to the slight outward bends in the loop portions of the lower legs by means of nuts clinched upon the axle at opposite ends thereof.

Another object is to provide a cart wherein the load of the forward container carried by the cart is adjacent the front wheels so that the over-all load is lighter when the cart is moved by the handles.

Another object is to provide a sturdy and rigid cart that is simple in construction, economical to manufacture and durable in use.

Other objects, advantages and novel details of construction of this invention will be made more apparent as this description proceeds, especially when considered in connection with the accompanying drawings wherein:

FIGURE 1 is a perspective view of a cart embodying my invention.

FIGURE 2 is a top plan view of the cart.

FIGURE 3 is a front elevational view of the cart.

FIGURE 4 is a perspective view of the cart when turned upside down upon the ground to be disassembled.

FIGURE 5 is a top plan view of the front and rear dual supporting legs after they have been disassembled from the dual horizontal sides and have been rotated 180°, so that the bases of the U-shaped crossbars are lowermost.

FIGURE 6 is a top plan view of the cart in fully collapsed position, and showing the front and rear dual supporting legs in a horizontal position between the dual horizontal sides, with the laterally extending outward projections of said legs inserted between the upper and lower arms of the dual horizontal sides, and with the bases of the U-shaped crossbars of said legs within the rings.

In the drawings, 10 and 11 respectively are laterally spaced substantially parallel dual horizontal metal sides, 12 and 13 respectively are laterally spaced substantially parallel dual supporting front and rear metal legs, 14 is the front axle, 15 and 16 respectively are ground engaging wheels, 17 and 18 respectively are horizontal metal crossbars, and 19 and 20 respectively are metal horizontal retaining rings of a cart embodying my invention.

As shown, each of the laterally spaced substantially parallel dual horizontal sides 10 and 11 comprises two vertically spaced longitudinally extending substantially parallel upper and lower arms 21 and 22 connected together at their rear ends by an open return bent portion 23.

The laterally spaced substantially parallel dual supporting legs 12 and 13 respectively are between and diverge downwardly from the dual horizontal sides 10 and 11. Preferably each front leg 12 comprises two spaced substantially parallel arms 24 and 25 connected together at their lower ends by an open return bent portion 26, and provided at their upper ends with laterally extending outward projections 27 and 28 respectively. Each rear leg 13 also comprises two spaced substantially parallel arms 29 and 30 connected together at their lower ends by an open return bent portion 31, and provided at their upper ends with laterally extending outward projections 32 and 33 respectively.

The laterally extending outward projections 27 and 28 of the front supporting legs 12 are diagonally disposed with respect to each other and extend outwardly through diagonally disposed horizontal openings 34 and 35 respectively in vertical metal plates 36 and 37 spanning the spaces between and rigidly secured to the upper and lower parallel arms 21 and 22 of the dual horizontal sides 10 and 11 at the forward ends thereof. The laterally extending outward projections 32 and 33 of the rear supporting legs 13 are diagonally disposed with respect to each other and extend outwardly through diagonally disposed horizontal openings 38 and 39 respectively in vertical metal plates 40 and 41 spanning the spaces between and rigidly secured to the upper and lower arms 21 and 22 of the dual horizontal sides 10 and 11 substantially midway their ends.

The front axle 14 comprises a straight rod on the undersides of and rigidly secured to the open return bent portions 26 of the front legs 12. Opposite ends 42 and 43 respectively of this axle 14 project laterally outward beyond the open return bent portions 26.

The ground engaging wheels 15 and 16 are rotatably mounted upon the laterally projecting opposite ends 42 and 43 of the front axle 14 and are held against displacement by nuts 44 and 45 respectively clinched upon said ends 42 and 43 at the outer sides of said wheels. Preferably the ground engaging wheels 15 and 16 are provided with tires 46 and 47.

The open return bent portions 26 of the front legs 12 are upon the inner sides of the ground engaging wheels 15 and 16 and are bent outwardly slightly to space the tires 46 and 47 respectively of the ground engaging wheels 15 and 16 outwardly from and out of contact with the front supporting legs 12.

The horizontal crossbars 17 and 18 are preferably U-shape in plan and are located substantially midway the upper and lower ends of the front and rear supporting legs 12 and 13. The front crossbar 17 opens forwardly, and opposite substantially parallel arms 48 and 49 of the U thereof extends transversely of and are rigidly secured to the dual arms of the front supporting legs 12. The rear crossbar 18 opens rearwardly, and opposite substantially parallel arms 50 and 51 of the U thereof extend transversely of and are rigidly secured to the dual arms of the rear supporting legs 13.

The horizontal retaining rings 19 and 20 are spaced longitudinally apart and extend between the dual horizontal sides 10 and 11. Preferably these rings are centered above the crossbars 17 and 18 and are rigidly secured at diametrically opposite points thereof to the upper arms 21 of the horizontal sides 10 and 11. These rings 19 and 20 embrace and retain suitable cylindrical containers (not shown) properly seated upon the crossbars 17 and 18 respectively.

The crossbars 17 and 18, front axle 14, and rings 19 and 20 maintain the horizontal sides 10 and 11 and supporting legs 12 and 13 in proper laterally spaced relation and provide the cart with the desired rigidity.

When the horizontal sides 10 and 11 are maintained in proper spaced relation as aforesaid, the lateral projections 27 and 28 respectively of the front legs 12 and the lateral projections 32 and 33 respectively of the rear legs 13 are maintained under tension in the openings in the metal plates 36, 37, 40 and 41 respectively, and can be removed therefrom only by exerting an inward force upon the upper ends of the dual supporting legs 12 and 13. This is particularly true due to the location of the rigid crossbars 17 and 18 respectively substantially midway opposite ends of the legs 12 and 13. Such crossbars 17 and 18 respectively serve as braces to maintain the legs laterally apart, and in doing so, cause the lateral projections 27, 28, 32 and 33 to be maintained under tension in the openings therefor in the metal plates 36, 37, 40 and 41 respectively. Thus the supporting legs 12 and 13 are secured under tension to the horizontal sides 10 and 11 of the cart, so that separate fasteners such as bolts, nuts, screws and the like are unnecessary.

In use, two containers, such as garbage cans, cylindrical receptacles, or bushel baskets (not shown) may be inserted downwardly through the rings 19 and 20 to rest upon and to be supported by the crossbars 17 and 18, or one or more planks or boards (not shown) may be placed upon the crossbars 17 and 18 to be supported thereby, as desired. In fact, the cart is also ideal for carrying suitable receptacles for seeding, feeding, weeding, grass clippings, and lawn and leaf rakings.

When the cart is manufactured, it is adapted to be shipped by the manufacturer to a dealer in collapsed condition within a suitable carton. Likewise, when a customer of the dealer moves from one place to another, the cart is adapted to be collapsed and moved in collapsed condition. In other words, the cart is adapted to be collapsed and erected for use whenever desired.

To collapse the cart, it is first turned upward down upon the ground, as illustrated in FIGURE 4, with the dual horizontal sides 10 and 11 in lowermost position. Then the front and rear dual supporting legs 12 and 13 are disassembled from the dual horizontal sides 10 and 11 by exerting an inward force upon the upper ends of the dual supporting legs 12 and 13 to remove such projections from the metal plates 36, 37, 40 and 41 respectively. The disassembled front and rear legs 12 and 13 are then rotated 180°, so that the bases 52 and 53 respectively of the U-shaped crossbars 17 and 18 are lowermost, as illustrated in FIGURE 5. The laterally extending outward projections 27, 28, 32 and 33 respectively of said legs 12 and 13 are then inserted between the upper and lower arms 21 and 22 respectively of the dual horizontal sides 10 and 11. The front and rear legs 12 and 13 are then placed in a horizontal position between the dual horizontal sides 10 and 11, with the front legs 12 at the forward end of said dual horizontal sides and with the rear legs 13 at the rear end of said horizontal sides, so that the open return bent portions 26 and 31 respectively of said legs are at the front and rear respectively of the dual horizontal sides, and the bases 52 and 53 of the U-shaped crossbars 17 and 18 respectively are received within the rings 19 and 20, as illustrated in FIGURE 6.

The front and rear legs 12 and 13 will then be in substantially parallel relation with and in close proximity to the dual horizontal sides 10 and 11. Thus the legs 12 and 13 are constructed to be nested in opposite directions between and in substantially parallel relation to the dual horizontal sides 10 and 11 when the cart is collapsed. This provides a substantially flat assembly that can be easily packaged and/or moved from one place to another.

What I claim as my invention is:

1. A collapsible cart having laterally spaced substantially parallel dual horizontal sides, each comprising two vertically spaced longitudinally extending substantially parallel upper and lower arms connected together at their rear ends by an open return bent portion, vertical plates secured at longitudinally spaced points to said upper and lower arms and having horizontal openings therein, front and rear pairs of laterally spaced substantially parallel dual supporting legs between and extending downwardly from said dual horizontal sides, each leg comprising two substantially parallel arms connected together at their lower ends by an open return bent portion and having laterally extending projections at their upper ends extending outwardly through the openings in said vertical plates, horizontally extending U-shaped crossbars located substantially midway the upper and lower ends of said front and rear supporting legs and maintaining said laterally extending projections under tension in the openings in said vertical plates, the U-shaped front crossbar opening forwardly with opposite substantially parallel arms of the U thereof extending transversely of and rigidly secured to the dual arms of the front supporting legs, the U-shaped rear crossbar opening rearwardly with opposite substantially parallel arms of the U thereof extending transversely of and rigidly secured to the dual arms of the rear supporting legs, and longitudinally spaced horizontal rings extending between and secured at diametrically opposite points to the upper arms of said dual horizontal sides, said rings being centered above said crossbars for holding containers supported on said crossbars.

2. The method of collapsing a cart having laterally spaced, substantially parallel dual horizontal sides, each comprising two vertically spaced longitudinally extending substantially parallel upper and lower arms connected together at their rear ends by an open return bent portion, vertical plates secured at longitudinally spaced points to said upper and lower arms and having horizontal openings therein, front and rear pairs of laterally spaced substantially parallel dual supporting legs between and extending downwardly from said dual horizontal sides, each leg comprising two substantially parallel arms connected together at their lower ends by an open return bent portion and having laterally extending projections at their upper ends extending outwardly through the openings in said vertical plates, horizontally extending U-shaped crossbars located substantially midway the upper and lower ends of said front and rear supporting legs and maintaining said laterally extending projections under tension in the openings in said vertical plates, U-shaped front crossbar opening forwardly with opposite substantially parallel arms of the U thereof extending transversely of and rigidly secured to the dual arms of the front supporting legs, the U-shaped rear crossbar opening rearwardly with opposite substantially parallel arms of the U thereof extending transversely of and rigidly secured to the dual arms of the rear supporting legs, and longitudinally spaced horizontal rings extending between and secured at diametrically opposite points to the upper arms of said dual horizontal sides, said rings being centered above said crossbars for holding containers supported on said crossbars; said method comprising the steps of turning said cart upside down upon the ground so that the dual horizontal sides are in lowermost position, disassembling the front and rear dual supporting legs from the dual horizontal sides by removing the laterally extending outward projections from said plates, rotating the disassembled front and rear legs 180° so that the bases respectively of said U-shaped crossbars are lowermost, inserting the laterally extending outward projections of said supporting legs between the upper and lower arms respectively of the dual horizontal sides, and placing the front and rear legs in a horizontal position between the dual horizontal sides, with the front legs at the forward end of said dual horizontal sides, and with the rear legs at the rear of said horizontal sides, so that the open return bent portions respectively of said horizontal sides, and the bases of the U-shaped crossbars are received within said rings.

References Cited in the file of this patent

UNITED STATES PATENTS

| | | |
|---|---|---|
| D. 183,571 | Joyce | Sept. 23, 1958 |
| 1,001,416 | Lloyd | Aug. 22, 1911 |
| 2,502,579 | McKibben | Apr. 4, 1950 |
| 2,768,044 | Jaffe | Oct. 23, 1956 |
| 2,784,004 | Hamrick | Mar. 5, 1957 |
| 2,813,646 | Rupe | Nov. 19, 1957 |
| 2,855,210 | Joyce | Oct. 7, 1958 |
| 2,910,059 | Gehne | Oct. 27, 1959 |
| 2,932,479 | Leach | Apr. 12, 1960 |